United States Patent
Feng et al.

(10) Patent No.: US 10,227,465 B2
(45) Date of Patent: Mar. 12, 2019

(54) CONDUCTIVE MULTILAYER SHEET FOR THERMAL FORMING APPLICATIONS

(71) Applicant: SABIC Global Technologies B.V., Bergen op Zoom (NL)

(72) Inventors: Wei Feng, Shanghai (CN); Yuzhen Xu, Shanghai (CN); Hengjie Lai, Shanghai (CN); Zhe Chen, Shanghai (CN); Yonglei Xu, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 114 days.

(21) Appl. No.: 15/502,312

(22) PCT Filed: Apr. 20, 2015

(86) PCT No.: PCT/IB2015/052886
§ 371 (c)(1),
(2) Date: Feb. 7, 2017

(87) PCT Pub. No.: WO2016/020766
PCT Pub. Date: Feb. 11, 2016

(65) Prior Publication Data
US 2017/0226303 A1 Aug. 10, 2017

Related U.S. Application Data

(60) Provisional application No. 62/034,227, filed on Aug. 7, 2014.

(51) Int. Cl.
| | |
|---|---|
| C08G 63/02 | (2006.01) |
| C08J 7/04 | (2006.01) |
| C08J 7/16 | (2006.01) |
| C08J 7/18 | (2006.01) |
| B29B 11/12 | (2006.01) |
| B29B 13/08 | (2006.01) |
| B29C 51/00 | (2006.01) |
| B29C 51/02 | (2006.01) |
| B29C 51/10 | (2006.01) |
| B32B 27/36 | (2006.01) |
| B29K 69/00 | (2006.01) |
| B29K 105/00 | (2006.01) |

(52) U.S. Cl.
CPC .............. *C08J 7/045* (2013.01); *B29B 11/12* (2013.01); *B29B 13/08* (2013.01); *B29C 51/002* (2013.01); *B29C 51/02* (2013.01); *B29C 51/10* (2013.01); *B32B 27/365* (2013.01); *C08J 7/16* (2013.01); *C08J 7/18* (2013.01); *B29K 2069/00* (2013.01); *B29K 2105/256* (2013.01); *B32B 2255/10* (2013.01); *B32B 2255/26* (2013.01); *C08J 2367/02* (2013.01); *C08J 2369/00* (2013.01); *C08J 2433/00* (2013.01); *C08J 2433/08* (2013.01); *C08J 2435/02* (2013.01); *C08J 2475/14* (2013.01)

(58) Field of Classification Search
USPC .................................................. 428/411, 412
See application file for complete search history.

(56) References Cited

U.S. PATENT DOCUMENTS

| | | |
|---|---|---|
| 5,476,535 A | 12/1995 | Khasin |
| 7,566,360 B2 | 7/2009 | Garbar et al. |
| 7,601,406 B2 | 10/2009 | Garbar et al. |
| 7,736,693 B2 | 6/2010 | Garbar et al. |
| 8,105,472 B2 | 1/2012 | Garbar et al. |
| 8,528,570 B2 | 9/2013 | Chang |
| 8,585,860 B2 | 11/2013 | Matsumura et al. |
| 8,846,182 B2 | 9/2014 | Kakihara et al. |
| 2006/0088690 A1 | 4/2006 | Arakawa et al. |
| 2007/0298253 A1 | 12/2007 | Hata et al. |
| 2008/0042997 A1 | 2/2008 | Endo |
| 2009/0004478 A1* | 1/2009 | Baetzold .............. C08G 18/672 428/412 |
| 2009/0206520 A1 | 8/2009 | Park |
| 2010/0003523 A1 | 1/2010 | Sharygin et al. |

(Continued)

FOREIGN PATENT DOCUMENTS

| | | |
|---|---|---|
| CN | 1632019 A | 6/2005 |
| CN | 102527621 A | 7/2012 |

(Continued)

OTHER PUBLICATIONS

Japanese Patent No. 2011016353; Date of Publication: Jan. 27, 2011; Machine Translation, 18 pages.

(Continued)

*Primary Examiner* — Terressa Boykin
(74) *Attorney, Agent, or Firm* — Cantor Colburn LLP

(57) ABSTRACT

A method of making a multilayer sheet includes: forming a substrate including a substrate first surface and a substrate second surface; applying a conductive layer including a base and a conductive coating to the substrate first surface; and applying an ultraviolet cured coating layer to a surface of the conductive layer opposite that in contact with the substrate second surface, wherein the ultraviolet cured coating layer comprises a multifunctional acrylate oligomer and an acrylate monomer; pressing the substrate, conductive layer, and ultraviolet cured coating layer together to form a stack; heating the stack; activating the ultraviolet cured coating layer with an ultraviolet radiation source; and removing the base from the stack leaving a conductive multilayer sheet; wherein the ultraviolet cured coating layer remains adhered to the conductive layer.

20 Claims, 3 Drawing Sheets

(56) References Cited

U.S. PATENT DOCUMENTS

| | | | |
|---|---|---|---|
| 2010/0055376 A1 | 3/2010 | Saito et al. |
| 2010/0065788 A1 | 3/2010 | Momose et al. |
| 2010/0252184 A1 | 10/2010 | Marimoto et al. |
| 2010/0263917 A1 | 10/2010 | Heo et al. |
| 2010/0310809 A1 | 12/2010 | Jiang et al. |
| 2011/0183120 A1 | 7/2011 | Sharygin et al. |
| 2011/0209901 A1 | 9/2011 | MacDonald et al. |
| 2011/0273085 A1 | 11/2011 | Garbar et al. |
| 2011/0287190 A1 | 11/2011 | Bulluck |
| 2011/0287196 A1 | 11/2011 | Shaw et al. |
| 2012/0032916 A1 | 2/2012 | Enoki |
| 2012/0092867 A1 | 4/2012 | Kasper |
| 2012/0098419 A1 | 4/2012 | Chiba et al. |
| 2013/0071557 A1 | 3/2013 | Haymov et al. |
| 2013/0136874 A1 | 5/2013 | Xia et al. |
| 2013/0224518 A1 | 8/2013 | Hikata et al. |
| 2013/0323482 A1 | 12/2013 | Poon |
| 2013/0344296 A1 | 12/2013 | Sharygin et al. |
| 2014/0008115 A1 | 1/2014 | Sato et al. |
| 2014/0085548 A1 | 3/2014 | Imamura et al. |
| 2014/0113085 A1 | 4/2014 | Busman |
| 2014/0225855 A1 | 8/2014 | Aitchison et al. |
| 2014/0238727 A1 | 8/2014 | Roger et al. |
| 2014/0267946 A1 | 9/2014 | Ding et al. |
| 2015/0090395 A1 | 4/2015 | Lin et al. |
| 2015/0147219 A1 | 5/2015 | Garbar |
| 2015/0185890 A1 | 7/2015 | Kaneko et al. |
| 2015/0267068 A1 | 9/2015 | Dorfman |
| 2015/0277616 A1 | 10/2015 | Wang |
| 2016/0239121 A1 | 8/2016 | Murakami et al. |

FOREIGN PATENT DOCUMENTS

| | | |
|---|---|---|
| CN | 103013416 A | 4/2013 |
| EP | 1847384 A1 | 10/2007 |
| EP | 2477230 A2 | 7/2012 |
| EP | 2634208 A1 | 9/2013 |
| JP | H11343460 A | 12/1999 |
| JP | 2000265118 A | 9/2000 |
| JP | 2005259485 A | 9/2005 |
| JP | 2005298619 A | 10/2005 |
| JP | 4161182 B2 | 10/2008 |
| JP | 2010267607 A | 11/2010 |
| JP | 2011016353 A | 1/2011 |
| JP | 2011121183 A | 6/2011 |
| JP | 2011178910 A | 9/2011 |
| JP | 2013119553 A | 6/2013 |
| JP | 2013171750 A | 9/2013 |
| JP | 2013246741 A | 12/2013 |
| KR | 20140093844 A | 7/2014 |
| WO | 9606438 A1 | 2/1996 |
| WO | 0145936 A1 | 6/2001 |
| WO | 03053614 A1 | 7/2003 |
| WO | 03106573 A1 | 12/2003 |
| WO | 2006053889 A1 | 5/2006 |
| WO | 2009136288 A2 | 11/2009 |
| WO | 2009149249 A1 | 12/2009 |
| WO | 2012170684 A1 | 12/2012 |
| WO | 2013041971 A2 | 3/2013 |
| WO | 2013061160 A2 | 5/2013 |
| WO | 2013068853 A2 | 5/2013 |
| WO | 2013077358 A1 | 5/2013 |
| WO | 2013128289 A2 | 9/2013 |
| WO | 2014028754 A1 | 2/2014 |
| WO | 2014118783 A1 | 8/2014 |
| WO | 2015105514 A1 | 7/2015 |
| WO | 2015125102 A1 | 8/2015 |
| WO | 2015125339 A1 | 8/2015 |
| WO | 2015162545 A1 | 10/2015 |
| WO | 2015162546 A1 | 10/2015 |

OTHER PUBLICATIONS

Japanese Patent No. 2011178910; Date of Publication: Sep. 15, 2011; Machine Translation, 21 pages.
Chinese Patent No. 103013416; Date of Publication: Apr. 3, 2013; Abstract Only, 1 page.
Japanese Patent No. 2000265118; Date of Publication Sep. 26, 2000; Abstract only; 1 page.
Chinese Patent No. 1632019 A; Date of Publication Jun. 29, 2005; Abstract only; 1 page.
Chinese Publication No. 102527621; Date of Publication: Jul. 4, 2012; Abstract Only, 2 pages.
International Search Report for International Application No. PCT/IB2015/052886; dated Sep. 22, 2015; 5 pages.
Japanese Patent No. 2005259485A; Date of Publication Sep. 22, 2005; Abstract only; 2 pages.
Japanese Patent No. 2005298619 A; Date of Publication Oct. 27, 2005; Abstract only; 1 page.
Japanese Patent No. 2010267607 A; Date of Publication Nov. 25, 2010; Abstract only; 2 pages.
Japanese Patent No. 2013119553 A; Date of Publication Jun. 17, 2013; Abstract only; 1 page.
Japanese Patent No. 2013171750 A; Date of Publication Sep. 2, 2013; Abstract only; 1 page.
Japanese Patent No. 2013246741A; Date of Publication Dec. 9, 2013; Abstract only; 1 page.
Japanese Patent No. 4161182; Date of Publication Oct. 8, 2008; Abstract only; 1 page.
Japanese Publication No. 2011121183; Date of Publication: Jun. 23, 2011; Abstract Only, 2 pages.
Japanese Publication No. H11343460; Date of Publication: Dec. 14, 1999; Abstract Only, 2 pages.
Korean Patent No. 20140093844; Date of Publication: Jul. 29, 2014; Abstract Only, 1 page.
Written Opinion of the International Search Report for International Application No. PCT/IB2015/052886; dated Sep. 22, 2015; 8 pages.

* cited by examiner

CONDUCTIVE MULTILAYER SHEET FOR THERMAL FORMING APPLICATIONS

CROSS REFERENCE TO RELATED APPLICATIONS

This application is a 371 of International Application No. PCT/M2015/052886, filed Apr. 20, 2015, which claims priority to U.S. Application No. 62/034,227 filed Aug. 7, 2014 both of which are incorporated herein by reference in their entirety.

BACKGROUND

Conductive layers can be useful in a variety of electronic devices. These layers can provide a number of functions such as electromagnetic interference shielding and electrostatic dissipation. These layers can be used in many applications including, but not limited to, touch screen displays, wireless electronic boards, photovoltaic devices, conductive textiles and fibers, organic light emitting diodes, electroluminescent devices, and electrophoretic displays, such as e-paper.

Conductive layers can include a network-like pattern of conductive traces formed of metal. The conductive layer can be applied to a substrate as a wet coating which can be sintered to form these networks. However, some substrate materials can be damaged by a sintering process. Additionally, it can be difficult to thermoform articles from the substrates with the conductive layers and conductivity can suffer from substrates which are thermoformed.

Thus, there is a need in the art for a coating layer which can provide strong adhesion between a conductive layer and a substrate, as well as allowing the substrate to be thermoformed without a loss in mechanical properties.

BRIEF DESCRIPTION

A multilayer sheet includes: a substrate including a substrate first surface and a substrate second surface; a conductive layer having a conductive layer first surface disposed on the substrate first surface; and an ultraviolet curable coating layer, comprising a multifunctional acrylate oligomer; and an acrylate monomer; wherein the ultraviolet curable coating layer includes a total weight, wherein 30% to 80% of the total weight comprises the multifunctional acrylate oligomer, and wherein 15% to 65% of the total weight comprises the acrylate monomer; wherein the ultraviolet curable coating layer is disposed on a conductive layer second surface.

A method of making a multilayer sheet includes: forming a substrate including a substrate first surface and a substrate second surface; applying a conductive layer including a base and a conductive coating to the substrate first surface; and applying an ultraviolet cured coating layer to a surface of the conductive layer opposite that in contact with the substrate second surface, wherein the ultraviolet cured coating layer comprises a multifunctional acrylate oligomer and an acrylate monomer, wherein the ultraviolet cured coating layer includes a total weight, wherein 30% to 80% of the total weight comprises the multifunctional acrylate oligomer, and wherein 15% to 65% of the total weight comprises the acrylate monomer; pressing the substrate, conductive layer, and ultraviolet cured coating layer together to form a stack; heating the stack; activating the ultraviolet cured coating layer with an ultraviolet radiation source; and removing the base from the stack leaving a conductive multilayer sheet; wherein the ultraviolet cured coating layer remains adhered to the conductive layer.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
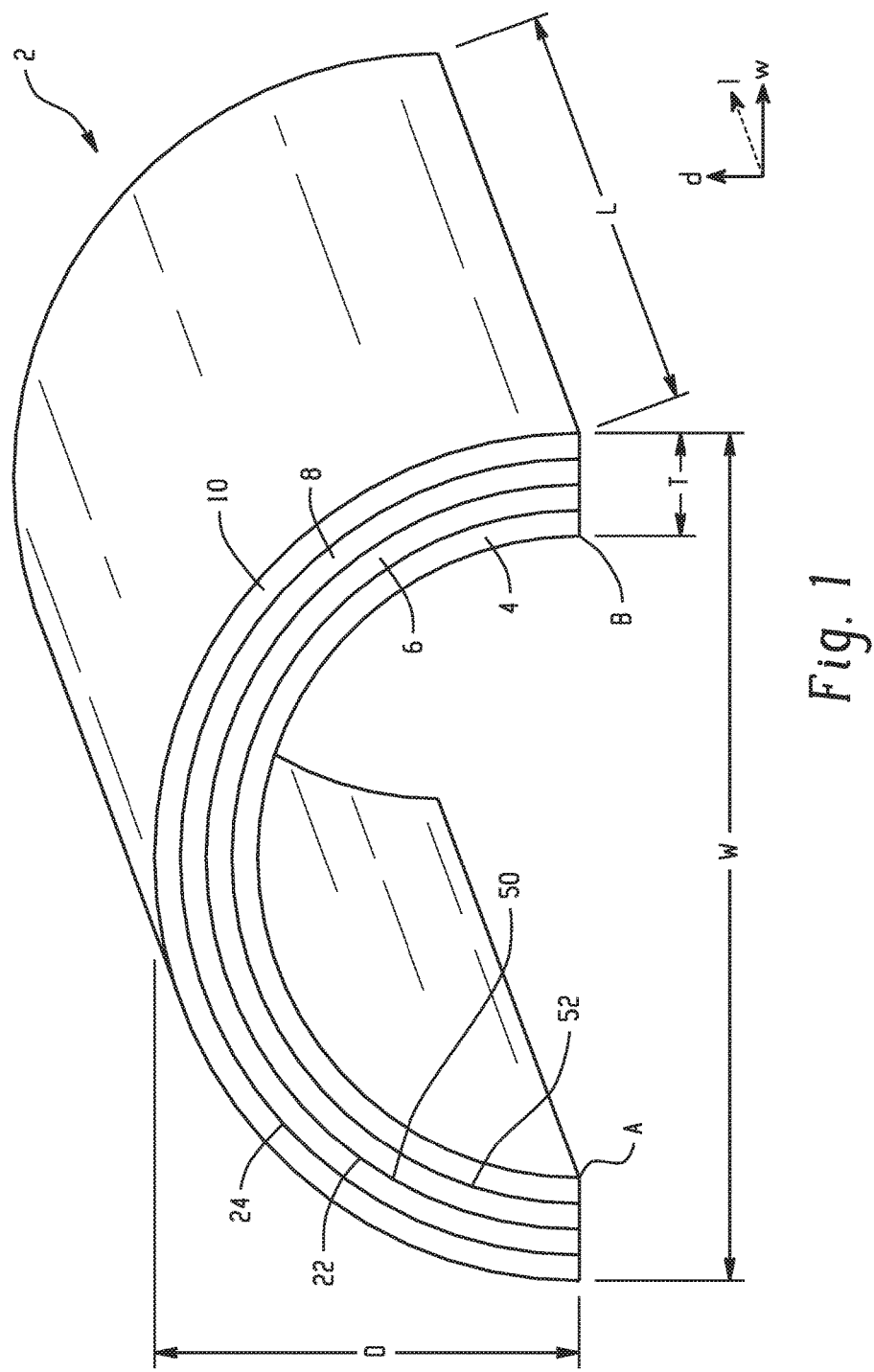
FIG. 1 is an illustration of a cross-sectional view of a conductive sheet or film including a conductive layer transferred thereto.

It can be difficult to thermoform multilayer sheets that include a conductive layer since the conductive layer can be brittle and therefore, can break easily. Additionally, if able to be thermoformed, the conductivity of the formed multilayer sheet can be lower than that of a multilayer sheet having an identical structure that has not been thermoformed. Disclosed herein is a multilayer sheet and a method of making the multilayered sheet, as well as a method of thermoforming the multilayered sheet to form an article. The multilayer sheet can include a substrate, an ultraviolet curable coating layer, and a conductive layer. The conductive layer can be disposed between the substrate and the ultraviolet curable coating layer. The ultraviolet light curable coating layer can be disposed between the substrate and the conductive layer. The substrate can include a substrate first surface and a substrate second surface, where the substrate second surface can be an outermost surface of the multilayer sheet. The ultraviolet light curable coating layer can include an ultraviolet light curable coating layer first surface and an ultraviolet light curable coating layer second surface, where the ultraviolet light curable coating layer surface can be disposed on the substrate first surface. The ultraviolet curable coating layer can include a multifunctional acrylate oligomer and an acrylate monomer. The ultraviolet curable coating layer can include a total weight, where 30% to 80% of the total weight can comprise the multifunctional acrylate oligomer and 15% to 65% of the total weight can comprise the acrylate monomer. The ultraviolet light curable coating layer can be disposed on the conductive layer first surface.

The conductive layer can be directly coated on the substrate. The substrate can be the substrate on which the conductive layer is originally formed or can be a substrate to which the conductive layer is transferred after formation.

The ultraviolet curable coating layer can include a multifunctional acrylate oligomer and an acrylate monomer. The ultraviolet curable coating layer can include a photoinitiator. The multifunctional acrylate oligomer can include an aliphatic urethane acrylate oligomer, a pentaerythritol tetraacrylate, an aliphatic urethane acrylate, an acrylic ester, a dipentaerythritol dexaacrylate, an acrylated resin, a trimethylolpropane triacrylate (TMPTA), a dipentaerythritol pentaacrylate ester, or a combination comprising at least one of the foregoing. In an embodiment, the multifunctional acrylate can include DOUBLEMER™ 5272 (DM5272) (commercially available from Double Bond Chemical Ind., Co., LTD., of Taipei, Taiwan, R.O.C.) which includes an aliphatic urethane acrylate oligomer in an amount from 30 weight percent (wt. %) to 50 wt. % of the multifunctional acrylate and a pentaerythritol tetraacrylate in an amount from 50 wt. % to 70 wt. % of the multifunctional acrylate.

The ultraviolet curable coating layer can optionally include a polymerization initiator to promote polymerization of the acrylate components. The optional polymerization initiators can include photoinitiators that promote polymerization of the components upon exposure to ultraviolet radiation.

The ultraviolet curable coating layer can include the multifunctional acrylate oligomer in an amount of 30 wt. % to 90 wt. % for example, 30 wt. % to 85 wt. %, or, 30 wt. % to 80 wt. %; the acrylate monomers in an amount of 5 wt. % to 65 wt. %, for example, 8 wt. % to 65 wt. %, or, 15 wt. % to 65 wt. %; and the optional photoinitiator present in an amount of 0 wt. % to 10 wt. %, for example, 2 wt. % to 8 wt. %, or, 3 wt. % to 7 wt. %, wherein weight is based on the total weight of the ultraviolet curable coating layer.

An aliphatic urethane acrylate oligomer can include 2 to 15 acrylate functional groups, for example, 2 to 10 acrylate functional groups.

The acrylate monomer (e.g., 1,6-hexanediol diacrylate, meth(acrylate) monomer) can include 1 to 5 acrylate functional groups, for example, 1 to 3 acrylate functional group (s). In an embodiment, the acrylate monomer can be 1,6-hexanediol diacrylate (HDDA), for example, 1,6-hexanediol diacrylate commercially available from SIGMA-ALDRICH.

The multifunctional acrylate oligomer can include a compound produced by reacting an aliphatic isocyanate with an oligomeric diol such as a polyester diol or polyether diol to produce an isocyanate capped oligomer. This oligomer can then be reacted with hydroxy ethyl acrylate to produce the urethane acrylate.

The multifunctional acrylate oligomer can be an aliphatic urethane acrylate oligomer, for example, a wholly aliphatic urethane (meth)acrylate oligomer based on an aliphatic polyol, which is reacted with an aliphatic polyisocyanate and acrylated. In one embodiment, the multifunctional acrylate oligomer can be based on a polyol ether backbone. For example, an aliphatic urethane acrylate oligomer can be the reaction product of (i) an aliphatic polyol; (ii) an aliphatic polyisocyanate; and (iii) an end capping monomer capable of supplying reactive terminus. The polyol (i) can be an aliphatic polyol, which does not adversely affect the properties of the composition when cured. Examples include polyether polyols; hydrocarbon polyols; polycarbonate polyols; polyisocyanate polyols, and mixtures thereof.

The multifunctional acrylate oligomer can include an aliphatic urethane tetraacrylate (i.e., a maximum functionality of 4) that can be diluted 20% by weight with a acrylate monomer, e.g., 1,6-hexanediol diacrylate (HDDA), tripropyleneglycol diacrylate (TPGDA), and trimethylolpropane triacrylate (TMPTA). A commercially available urethane acrylate that can be used in forming the ultraviolet curable coating layer can be EBECRYL™ 8405, EBECRYL™8311, EBECRYL™ 8807, EBECRYL™ 303, or EBECRYL™ 8402, each of which is commercially available from Allnex.

Some commercially available oligomers which can be used in the ultraviolet curable coating layer can include, but are not limited to, multifunctional acrylates that are part of the following families: the PHOTOMER™ Series of aliphatic urethane acrylate oligomers from IGM Resins, Inc., St. Charles, Ill.; the Sartomer SR Series of aliphatic urethane acrylate oligomer from Sartomer Company, Exton, Pa.; the Echo Resins Series of aliphatic urethane acrylate oligomers from Echo Resins and Laboratory, Versailles, Mo.; the BR Series of aliphatic urethane acrylates from Bomar Specialties, Winsted, Conn.; the DOUBLEMER™ Series of aliphatic oligomers from Double Bond Chemical Ind., Co., LTD., of Taipei, Taiwan, R.O.C.; and the EBECRYL™ Series of aliphatic urethane acrylate oligomers from Allnex. For example, the aliphatic urethane acrylates can be KRM8452 (10 functionality, Allnex), EBECRYL™ 1290 (6 functionality, Allnex), EBECRYL™ 1290 N (6 functionality, Allnex), EBECRYL™ 512 (6 functionality, Allnex), EBECRYL™ 8702 (6 functionality, Allnex), EBECRYL™ 8405 (3 functionality, Allnex), EBECRYL™ 8402 (2 functionality, Allnex), EBECRYL™ 284 (3 functionality, Allnex), CN9010™ (Sartomer), CN9013™ (Sartomer), SR351 (Sartomer) or Laromer TMPTA (BASF), SR399 (Sartomer) dipentaerythritol pentaacrylate esters and dipentaerythritol hexaacrylate DPHA (Allnex), CN9010 (Sartomer), SR306 (tripropylene glycol diacrylate, Sartomer), CN8010 (Sartomer), CN981 (Sartomer), PM6892 (IGM), DOUBLEMER™ DM5272 (Double Bond), DOUBLEMER™ DM321HT (Double Bond), DOUBLEMER™ DM353L (Double Bond), DOUBLEMER™ DM554 (Double Bond), DOUBLEMER™ DM5222 (Double Bond), and DOUBLEMER™ DM583-1 (Double Bond).

Another component of the ultraviolet curable coating layer can be an acrylate monomer having one or more acrylate or methacrylate moieties per monomer molecule. The acrylate monomer can be mono-, di-, tri-, tetra- or penta functional. In one embodiment, di-functional monomers are employed for the desired flexibility and adhesion of the coating. The monomer can be straight- or branched-chain alkyl, cyclic, or partially aromatic. The reactive monomer diluent can also comprise a combination of monomers that, on balance, result in a desired adhesion for a coating composition on the substrate, where the coating composition can cure to form a hard, flexible material having the desired properties.

The acrylate monomer can include monomers having a plurality of acrylate or methacrylate moieties. These can be di-, tri-, tetra- or penta-functional, specifically di-functional, in order to increase the crosslink density of the cured coating and therefore can also increase modulus without causing brittleness. Examples of polyfunctional monomers include, but are not limited, to $C_6$-$C_{12}$ hydrocarbon diol diacrylates or dimethacrylates such as 1,6-hexanediol diacrylate (HDDA) and 1,6-hexanediol dimethacrylate; tripropylene glycol diacrylate or dimethacrylate; neopentyl glycol diacrylate or dimethacrylate; neopentyl glycol propoxylate diacrylate or dimethacrylate; neopentyl glycol ethoxylate diacrylate or dimethacrylate; 2-phenoxylethyl (meth)acrylate; alkoxylated aliphatic (meth)acrylate; polyethylene glycol (meth) acrylate; lauryl (meth)acrylate, isodecyl (meth)acrylate, isobornyl (meth)acrylate, tridecyl (meth)acrylate; and mixtures comprising at least one of the foregoing monomers. For example, the acrylate monomer can be 1,6-hexanediol diacrylate (HDDA), alone or in combination with another monomer, such as tripropyleneglycol diacrylate (TPGDA), trimethylolpropane triacrylate (TMPTA), oligotriacrylate (OTA 480), or octyl/decyl acrylate (ODA).

Another component of the ultraviolet curable coating layer can be an optional polymerization initiator such as a photoinitiator. Generally, a photoinitiator can be used if the coating composition is to be ultraviolet cured; if it is to be cured by an electron beam, the coating composition can comprise substantially no photoinitiator.

When the ultraviolet curable coating layer is cured by ultraviolet light, the photoinitiator, when used in a small but effective amount to promote radiation cure, can provide reasonable cure speed without causing premature gelation of the coating composition. Further, it can be used without interfering with the optical clarity of the cured coating material. Still further, the photoinitiator can be thermally stable, non-yellowing, and efficient.

Photoinitiators can include, but are not limited to, the following: α-hydroxyketone; hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy) phenyl-(2-hydroxy-2-propyl) ketone; diethoxyacetophenone; 2,2-di-sec-butoxyacetophenone; diethoxy-phenyl acetophenone; bis (2,6-dimethoxybenzoyl)-2,4-, 4-trimethylpentylphosphine oxide; 2,4,6-trimethylbenzoyldiphenylphosphine oxide; 2,4,6-trimethylbenzoylethoxyphenylphosphine oxide; and combinations comprising at least of the foregoing.

Exemplary photoinitiators can include phosphine oxide photoinitiators. Examples of such photoinitiators include the IRGACURE™, LUCIRIN™ and DAROCURE™ series of phosphine oxide photoinitiators available from BASF Corp.; the ADDITOL™ series from Allnex; and the ESACURE™ series of photoinitiators from Lamberti, s.p.a. Other useful photoinitiators include ketone-based photoinitiators, such as hydroxy- and alkoxyalkyl phenyl ketones, and thioalkylphenyl morpholinoalkyl ketones. Also desirable can be benzoin ether photoinitiators. Specific exemplary photoinitiators include bis(2,4,6-trimethylbenzoyl)-phenylphosphine oxide supplied as IRGACURE™ 819 by BASF or 2-hydroxy-2-methyl-1-phenyl-1-propanone supplied as ADDITOL HDMAP™ by Allnex or 1-hydroxy-cyclohexyl-phenyl-ketone supplied as IRGACURE™ 184 by BASF or RUNTECURE™ 1104 by Changzhou Runtecure chemical Co. Ltd, or 2-hydroxy-2-methyl-1-phenyl-1-propanone supplied as DAROCURE™ 1173 by BASF.

The photoinitiator can be chosen such that the curing energy is less than 2.0 Joules per square centimeter ($J/cm^2$), and specifically less than 1.0 $J/cm^2$, when the photoinitiator is used in the designated amount.

The polymerization initiator can include peroxy-based initiators that can promote polymerization under thermal activation. Examples of useful peroxy initiators include benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy) hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di (trimethylsilyl)peroxide, trimethylsilylphenyltriphenylsilyl peroxide, and the like, and combinations comprising at least one of the foregoing polymerization initiators.

A conductive layer can contain an electromagnetic shielding material. The conductive layer can include a conductive material. Conductive materials can include pure metals such as silver (Ag), nickel (Ni), copper (Cu), metal oxides thereof, combinations comprising at least one of the foregoing, or metal alloys comprising at least one of the foregoing, or metals or metal alloys produced by the Metallurgic Chemical Process (MCP) described in U.S. Pat. No. 5,476,535. Metals of the conductive layer can be nanometer sized, e.g., such as where 90% of the particles can have an equivalent spherical diameter of less than 100 nanometers (nm). The metal particles can be sintered to form a network of interconnected metal traces defining randomly shaped openings on the substrate surface to which it is applied. The sintering temperature of the conductive layer can be 300° C. which can exceed the heat deflection temperature of some substrate materials. After sintering, the surface resistance of the conductive layer can be less than or equal to 0.1 ohm per square (ohm/sq). The conductive layer can have a surface resistance of less than 1/10th of the surface resistance of an indium tin oxide coating. The conductive layer can be transparent.

Unlike networks formed of nanometer sized metal wires, the conductive network formed of nanometer sized metal particles can be bent without reducing the conductivity and/or increasing the electrical resistance of the conductive network. For example, networks of metal wires can separate at junctions when bent, which can reduce the conductivity of the wire network, whereas the metal network of nanometer sized particles can deform elastically without separating traces of the network, thereby maintaining the conductivity of the network.

The conductive layer can be disposed adjacent to a surface of a substrate, e.g., a donor substrate. The conductive layer can be formed on a substrate, e.g., donor substrate, and after formation, the coating can be transferred to another substrate, e.g., recipient substrate. The conductive layer can be applied to a substrate using any wet coating technique, e.g., screen printing, spreading, spray coating, spin coating, dipping, and the like.

The substrate can be any shape. The substrate can have a first surface and a second surface (e.g., a substrate first surface and a substrate second surface). The substrate can include a polymer, a glass, or a combination of polymer and glass. The first surface of the substrate can comprise a first polymer. The second surface of the substrate can comprise a second polymer. The first surface of the substrate can be disposed opposite the second surface of the substrate. The first surface of the substrate can consist of the first polymer. The second surface of the substrate can consist of the second polymer. The first surface of the substrate can consist of the first polymer and the second surface of the substrate can consist of the second polymer. The first polymer and the second polymer can be co-extruded to form the substrate. The first polymer and the second polymer can be different polymers, e.g. can comprise different chemical compositions. The substrate can be flat and can include the first surface and the second surface where the second surface can be disposed opposite the first surface, such as co-extruded forming opposing sides of the substrate. The substrate can be flexible.

The ultraviolet curable coating layer can be disposed adjacent to a surface of the substrate (e.g., dispersed across the surface of the substrate). The ultraviolet curable coating layer can abut a surface of the substrate. The ultraviolet curable coating layer can be used to transfer the conductive layer from a donor substrate to a recipient substrate. The ultraviolet curable coating layer can have a greater adhesion to the recipient substrate than to the donor substrate, such that when the ultraviolet curable coating layer is sandwiched between the recipient substrate and the donor substrate and the donor substrate is removed, the ultraviolet curable coating layer can preferentially adhere to the recipient substrate rather than to the donor substrate. The ultraviolet curable coating layer can be in mechanical communication with both the nano-metal network of the conductive layer and a surface of a substrate.

The ultraviolet curable coating layer can be disposed on a surface of the conductive layer. The substrate can be a donor substrate to which a conductive layer is adhered, or can be a recipient substrate that can receive the conductive layer from the donor substrate. The ultraviolet curable coating layer can be applied to the conductive layer, which can be applied to a donor substrate, such that the conductive layer can be disposed between the ultraviolet curable coating layer and the donor substrate. The donor substrate including a conductive layer and an ultraviolet curable coating layer can be coupled to a recipient substrate such that the conductive layer can abut a surface of the recipient substrate and can be sandwiched between the conductive layer and a surface of the recipient substrate. The donor substrate can then be removed and the ultraviolet curable coating layer and the conductive layer can be left adhered to the recipient substrate. The ultraviolet curable coating layer can at least partially surround the conductive layer. The conductive layer can be at least partially embedded in the ultraviolet curable coating layer, such that a portion of the ultraviolet curable coating layer can extend into an opening in the nano-metal network of the conductive layer.

The donor substrate, including the conductive layer, can be coupled to the ultraviolet curable coating layer where the conductive layer can be disposed on the surface of the recipient substrate, and the donor substrate can be removed such that the conductive layer can remain coupled to the ultraviolet curable coating layer and adjacent to the recipient substrate. The donor substrate can include a polymer that is capable of withstanding the conductive layer sintering temperature without damage.

A substrate can optionally include a substrate coating disposed on a surface of the substrate. For example, the substrate coating can be disposed on an outermost surface of the substrate, e.g., the first surface. The substrate coating can be disposed on two opposing surfaces of the substrate. The substrate coating can provide a protective portion to the substrate. The protective portion, such as an acrylic hard coat, can provide abrasion resistance to the underlying substrate. The protective portion can be disposed adjacent to a surface of the substrate. The protective portion can abut a surface of the substrate. The protective portion can be disposed opposite the conductive layer. The protective portion can include a polymer. In an embodiment, a substrate coating can include a polymeric coating offering good pencil hardness (e.g., 4-5H measured according to ASTM D3363 on polymethyl methacrylate or HB-F measured according to ASTM D3363 on polycarbonate) and chemical/abrasion resistance, together with desirable processing characteristics. For example, the substrate coating can include a coating such as a LEXAN™ OQ6DA film, commercially available from SABIC's Innovative Plastics Business or a similar acrylic based or silicon based coating, film, or coated film, which can provide enhanced pencil hardness, enhanced chemical resistance, variable gloss and printability, enhanced flexibility, and/or enhanced abrasion resistance. The coating can be 0.1 millimeter (mm) to 2 mm thick, for example, 0.25 mm to 1.5 mm, or, 0.5 mm to 1.2 mm thick. The coating can be applied on one or more sides of the substrate. For example, the substrate coating can include an acrylic hard coat.

FIG. 1 is an illustration of a multilayer sheet 2, e.g., a conductive sheet or film 2. The sheet or film 2 can include a conductive layer 6, an ultraviolet curable coating layer 4, a substrate 8, and an optional protective portion 10. The sheet or film 2 can be bent and/or formed (e.g., extruded), such that the depth of the shape of the sheet or film, D, is greater than the total thickness, T, of the sheet or film 2. The electrical conductivity of the conductive sheet or film 2 can be measured from point A to point B. The substrate can include a first surface 22 and a second surface 24. The conductive layer 6 can be disposed adjacent to the first surface 22 of the substrate 8. The conductive layer 6 can be applied directly to the first surface 22 of the substrate 8 or the conductive layer 6 can be applied to the first surface 22 of the substrate 8 via a substrate. The donor substrate can then be coupled to the first surface 22 of the substrate 8, such that the conductive layer 6 can be sandwiched between the ultraviolet curable coating layer 4 and the first surface 22 of the substrate 8, then the donor substrate can be removed, leaving the conductive layer 6 and the ultraviolet curable coating layer 4 adjacent to the first surface 22 of the substrate 8. The conductive layer 6 can have a conductive layer first surface 50 and a conductive layer second surface 52. The ultraviolet curable coating layer 4 can be adjacent to the conductive layer second surface 52.

The sheet or film 2 can be curved in at least one dimension, e.g., the w-axis dimension. The sheet or film 2 can be curved in at least two dimensions, e.g., the w-axis and h-axis dimensions. The sheet or film 2 can have a width, W, measured along a w-axis. The sheet or film 2 can have a depth, D, measured along a d-axis. The sheet or film 2 can have a length, L, measured along the l-axis. The sheet or film 2 can be flexible such that the change in the electrical resistance (measured between point A to point B) can be less than or equal to 1 ohm when the integrated conductive film 2 is bent. The thickness, T, of the sheet or film 2 can be 0.05 mm to 25 mm, for example, 0.05 mm to 10 mm, or, 0.1 mm to 5 mm. The sheet or film 2 can be curved. The depth, D, can be larger than twice the total thickness, T, of the sheet or film 2. The sheet or film 2 can have a maximum depth anywhere along the film. The conductive layer 6 can be at least partially surrounded by portions of the ultraviolet curable coating layer 4, such that portions of the ultraviolet curable coating layer 6 can extend into openings in the nano-metal network of the conductive layer 6.

Figure 2:
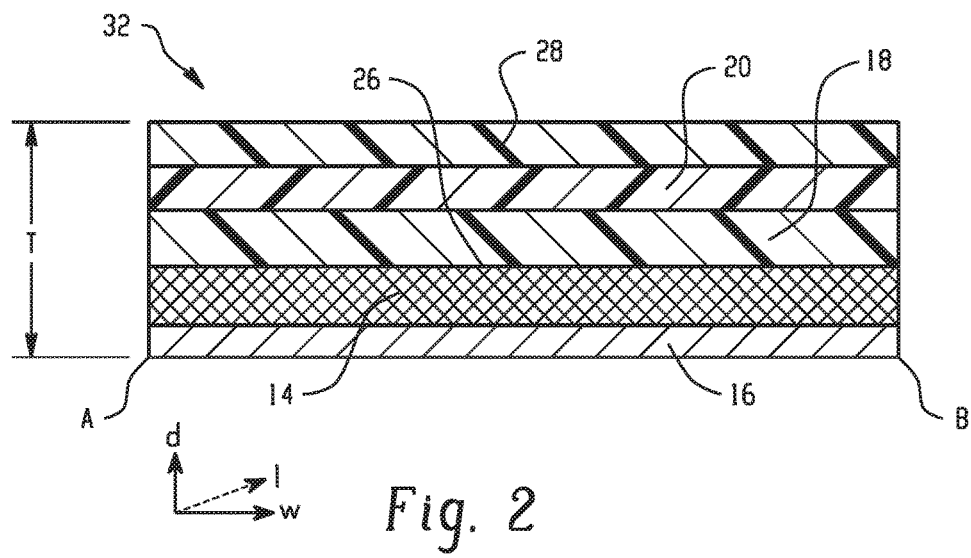
FIG. 2 is an illustration of a cross-sectional view of a portion of a conductive sheet or film including a conductive layer transferred thereto and a coated substrate.

FIG. 2 is an illustration of a portion of a cross-section of a conductive sheet or film 32. The conductive sheet or film 32 can include a conductive layer 14, an ultraviolet curable coating layer 16, an optional first substrate coating 18, an optional second substrate coating 28, and a substrate 20. The electrical conductivity of the conductive sheet or film 32 can be measured from point A to point B. An optional first substrate coating 18 can be disposed adjacent to the substrate 20 such that the conductive layer 14 can be adhered to a surface 26 of the optional first substrate coating 18, and adjacent to the substrate 20. The conductive layer 14 can be at least partially surrounded by portions of the ultraviolet curable coating layer 16, such that portions of the ultraviolet curable coating layer 16 can extend into openings in the nano-metal network of the conductive layer 14. The sheet or film 32 can include an optional second substrate coating 28 disposed on a surface opposing the surface that the optional first substrate coating 18 is disposed.

The conductive sheet or film can transmit greater than or equal to 50% (e.g. 50 percent transmittance) of incident visible light (e.g., electromagnetic radiation having a frequency of 430 THz to 790 THz), for example, 60% to 100%, or, 70% to 100%. A transparent polymer, substrate, coating, film, and/or material of the sheet or film can transmit greater than or equal to 50% of incident EMR having a frequency of 430 THz to 790 THz, for example, 75% to 100%, or, 90% to 100%. Transparency is described by two parameters, percent transmission and percent haze. Percent transmittance and percent haze for laboratory scale samples can be determined using ASTM D1003, Procedure A using CIE standard illuminant C using a Haze-Gard test device. ASTM D1003 (Procedure B, Spectrophotometer, using illuminant C with diffuse illumination with unidirectional viewing) defines percent transmittance as:

$$\% \; T = \left(\frac{I}{I_O}\right) \times 100\% \qquad [1]$$

wherein: I is the intensity of the light passing through the test sample and $I_o$ is the Intensity of incident light.

The substrate can be formed by any polymer forming process. For example, a substrate can be formed by a co-extrusion process. The substrate can be co-extruded into a flat sheet. The substrate can be co-extruded into a flat sheet including a first surface comprising a first polymer and a second surface comprising a second polymer having a different chemical composition than the first polymer. The substrate can be co-extruded into a flat sheet including a first surface consisting of only a first polymer and a second surface consisting of only a second polymer having a different chemical composition than the first polymer. The substrate can be co-extruded into a flat sheet including a first surface consisting of polycarbonate and a second surface consisting of poly(methyl methacrylate) (PMMA).

The ultraviolet curable coating layer can be cured. Curing the ultraviolet curable coating layer can include waiting, heating, drying, exposing to electromagnetic radiation (e.g., electromagnetic radiation (EMR) in the UV spectrum), or a combination of one of the foregoing. If present, the donor substrate can be removed, leaving the ultraviolet curable coating layer and conductive layer adhered to a surface of the film.

The donor substrate can include a polymer. The adhesion between the ultraviolet curable coating layer and a donor or recipient substrate can be determined following ASTM D3359. The adhesion, per ASTM D3359, between the ultraviolet curable coating layer and the polymer of the donor substrate can be 0B. The adhesion, per ASTM D3359, between the conductive layer and the donor substrate can be 0B. The adhesion between the ultraviolet curable coating layer and the polymer of the recipient substrate can be 5B. The adhesion between the conductive layer and the polymer of the recipient substrate can be 5B. The ultraviolet curable coating layer can have a greater adhesion for the polymer of the recipient substrate than for the polymer of the donor substrate.

The conductive sheet or film can be bent such that it is not flat. The substrate can be bent such that it is not coplanar with a plane defined by the length and width dimensions of the substrate (l-w plane in the attached figures). The substrate can be bent into a curved shape such that a depth dimension exceeds a total thickness, T, of the substrate (e.g., acknowledging that the thickness of the substrate can vary due to imperfections in manufacturing, such as tool tolerances, variations in process conditions such as temperature, variation in shrinkage during cooling, and the like). The substrate can be bent such that a portion of the substrate has a depth dimension greater than or equal to twice the total thickness, T, of the panel.

The perimeter shape of the conductive sheet or film can be any shape, e.g. circular, elliptical, or the shape of a polygon having straight or curved edges.

The substrate can include flexible films that can be formed, molded, and withstand torsion and tension. The conductive layer can be applied to a substrate using any suitable wet coating process, such as spray coating, dip coating, roll coating, and the like. The films can be formed using roll to roll manufacturing or a similar process.

A multilayer sheet (e.g., a conductive sheet or film) can be prepared by forming a substrate including a substrate first surface and a substrate second surface. A conductive layer including a base and a conductive coating to can then be applied to the substrate second surface. An ultraviolet cured coating layer can then be applied to a surface of the conductive layer opposite that in contact with the substrate second surface, wherein the ultraviolet cured coating layer comprises a multifunctional acrylate oligomer and an acrylate monomer, wherein the ultraviolet cured coating layer includes a total weight, wherein 30% to 80% of the total weight comprises the multifunctional acrylate oligomer, and wherein 15% to 65% of the total weight comprises the acrylate monomer. The substrate, conductive layer, and ultraviolet cured coating layer can then be pressed together to form a stack and the stack can be heated. The ultraviolet cured coating layer can then be activated with an ultraviolet radiation source. The base can then be removed from the stack leaving a conductive multilayer sheet. The ultraviolet cured coating layer can remain adhered to the conductive layer.

The multilayer sheet can then be thermoformed to form a thermoformed article. Thermoforming the multilayer sheet to form an thermoformed article can include placing the multilayer sheet on a clamp of a mold, fixing the multilayer sheet to the clamp, pushing the multilayer shet out of the clamp by raising the mold, lowering the mold, and heating the multilayer sheet while simultaneously beginning the vacuum forming and raising the mold to form the thermoformed article.

A conductive sheet or film can also be formed by transferring the conductive layer from a donor substrate to a recipient substrate. The substrates can be heated. The substrates can be heated to a temperature of greater than or equal to 70° C. The substrates can be heated to a temperature of 70° C. to 95° C. The ultraviolet curable coating layer can be applied to a surface of the donor substrate. The ultraviolet curable coating layer can be applied to a surface of the recipient substrate. The ultraviolet curable coating layer can be applied to a substrate using any wet coating technique. The donor and recipient substrates can be pressed together to form a stack, where the ultraviolet curable coating layer and the conductive layer can be sandwiched between surfaces of the donor and recipient substrates. Pressing can be performed by any suitable device, e.g., roller pressing, belt pressing, double belt pressing, stamping, die pressing, or a combination comprising at least one of the foregoing. The pressing device can be used to remove air bubbles trapped between the substrates. The pressing can include pressing the donor and recipient substrates together to a pressure of greater than 0.2 megaPascal (MPa), for example, 0.2 MPa to 1 MPa, or, 0.2 MPa to 0.5 MPa, or, 0.3 MPa, while the conductive layer and ultraviolet curable coating layer are sandwiched in between the donor and recipient substrates. The stack of substrates can be exposed to heat, ultraviolet (UV) light or some other cure initiator to cure the ultraviolet curable coating layer. The donor substrate can be removed, leaving behind the recipient substrate having a securely adhered conductive layer including the ultraviolet curable coating layer.

In an embodiment, the conductive layer can be formed on a donor substrate, the ultraviolet curable coating layer can be applied to the donor substrate or to the recipient substrate, the donor and recipient substrates can be heated and pressed together such that the ultraviolet curable coating layer can be sandwiched between the substrates, and the donor substrate can be removed leaving the conductive layer and the ultraviolet curable coating layer on the recipient substrate.

A polymer of a conductive sheet, film, or substrate, or used in the manufacture of the conductive sheet, film, or substrate, (e.g., recipient substrate, donor substrate, ultraviolet curable coating layer, and optional substrate coating), can include a thermoplastic resin, a thermoset resin, or a combination comprising at least one of the foregoing.

Possible thermoplastic resins include, but are not limited to, oligomers, polymers, ionomers, dendrimers, copolymers such as graft copolymers, block copolymers (e.g., star block copolymers, random copolymers, and the like) or a combination comprising at least one of the foregoing. Examples of such thermoplastic resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (PI) (e.g., polyetherimides (PEI)), acrylonitrile-styrene-butadiene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyethylene terephthalate (PET), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidones, polycarboranes, polyoxabicyclononanes, polydibenzofurans, polyphthalamide, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazanes, polysiloxanes, fluoropolymers (e.g., polyvinyl fluourides (PVF), polyvinylidene fluorides (PVDF), fluorinated ethylene-propylenes (FEP), polyethylene tetrafluoroethylenes (ETFE)), polyethylene naphthalates (PEN), cyclic olefin copolymers (COC), or a combination comprising at least one of the foregoing.

More particularly, a thermoplastic resin can include, but is not limited to, polycarbonate resins (e.g., LEXAN™ resins, including LEXAN™ CFR resins, commercially available from SABIC's Innovative Plastics business), polyphenylene ether-polystyrene resins (e.g., NORYL™ resins, commercially available from SABIC's Innovative Plastics business), polyetherimide resins (e.g., ULTEM™ resins, commercially available from SABIC's Innovative Plastics business), polybutylene terephthalate-polycarbonate resins (e.g., XENOY™ resins, commercially available from SABIC's Innovative Plastics business), copolyestercarbonate resins (e.g., LEXAN™ SLX resins, commercially available from SABIC's Innovative Plastics business), or a combination comprising at least one of the foregoing resins. Even more particularly, the thermoplastic resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer, polycarbonate-dimethyl bisphenol cyclohexane (DMBPC) polycarbonate copolymer (e.g., LEXAN™ DMX and LEXAN™ XHT resins commercially available from SABIC's Innovative Plastics business), polycarbonate-polyester copolymer (e.g., XYLEX™ resins, commercially available from SABIC's Innovative Plastics business),), linear polycarbonate, branched polycarbonate, end-capped polycarbonate (e.g., nitrile end-capped polycarbonate), or a combination comprising at least one of the foregoing, for example, a combination of branched and linear polycarbonate.

"Polycarbonates" as used herein further include homopolycarbonates, (wherein each $R^1$ in the polymer is the same), copolymers comprising different $R^1$ moieties in the carbonate (referred to herein as "copolycarbonates"), copolymers comprising carbonate units and other types of polymer units, such as ester units, and combinations comprising at least one of homopolycarbonates and/or copolycarbonates. As used herein, a "combination" is inclusive of blends, mixtures, alloys, reaction products, and the like.

The polycarbonate composition can further include impact modifier(s). Exemplary impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like. Impact modifiers are generally present in amounts of 1 to 30 wt. %, based on the total weight of the polymers in the composition.

A polymer of the film can include various additives ordinarily incorporated into polymer compositions of this type, with the proviso that the additive(s) are selected so as to not significantly adversely affect the desired properties of the polymeric composition, in particular hydrothermal resistance, water vapor transmission resistance, puncture resistance, and thermal shrinkage. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. The total amount of additives (other than any impact modifier, filler, or reinforcing agents) is generally 0.01 to 5 wt. %, based on the total weight of the composition.

Light stabilizers and/or ultraviolet light (UV) absorbing stabilizers can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 parts by weight, based on 100 parts by weight of the total composition, excluding any filler.

UV light absorbing stabilizers include triazines, dibenzoylresorcinols (such as TINUVIN* 1577 commercially available from BASF and ADK STAB LA-46 commercially available from Asahi Denka), hydroxybenzophenones; hydroxybenzotriazoles; hydroxyphenyl triazines (e.g., 2-hydroxyphenyl triazine); hydroxybenzotriazines; cyanoacrylates; oxanilides; benzoxazinones; 2-(2H-benzotriazol-2-yl)-4-(1,1,3,3-tetramethylbutyl)-phenol (CYAS ORB* 5411); 2-hydroxy-4-n-octyloxybenzophenone (CYAS ORB* 531); 2-[4,6-bis(2,4-dimethylphenyl)-1,3,5-triazin-2-yl]-5-(octyloxy)-phenol (CYAS ORB* 1164); 2,2'-(1,4-phenylene)bis(4H-3,1-benzoxazin-4-one) (CYAS ORB* UV-3638); 1,3-bis[(2-cyano-3,3-diphenylacryloyl)oxy]-2,2-bis[[(2-cyano-3, 3-diphenylacryloyl)oxy]methyl]propane (UVINUL* 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with a particle size less than or equal to 100 nanometers, or combinations comprising at least one of the foregoing UV light absorbing stabilizers. UV light absorbing stabilizers are used in amounts of 0.01 to 5 parts by weight, based on 100 parts by weight of the total composition, excluding any filler.

The recipient substrate can include polycarbonate. The recipient substrate can include poly(methyl methacrylate) (PMMA). The recipient substrate can include polyethylene terephthalate (PET). The recipient substrate can include polyethylene naphthalate (PEN). The recipient substrate can include glass. The recipient substrate can include a combination comprising at least one of the foregoing. The donor substrate can include polyethylene terephthalate (PET). The ultraviolet curable coating layer can be applied to a surface of the substrate comprising polycarbonate. The ultraviolet curable coating layer can be applied to a surface of the substrate consisting of polycarbonate. The ultraviolet curable coating layer can be disposed between the conductive layer and a surface of the substrate comprising polycarbonate. The conductive layer can be disposed between the ultraviolet curable coating layer and a surface of the substrate consisting of polycarbonate.

EXAMPLES

In the following examples, haze was tested according to ASTM D1003 procedure A using CIE standard illuminant C using a Haze-Gard test device, while adhesion between the ultraviolet curable coating layer and the substrate was measured according to ASTM D3359, where a value of 5B mean 100% adhesion on the substrate and 0B means 100 delamination between the ultraviolet curable coating layer and the substrate. The relationship between conductive film elongation percentage and surface resistivity was characterized by a Dynamic Mechanical Analysis (DMA) method. The conductive film was cut into a 5 mm by 30 mm sample, then fixed on the holders of the DMA Instrument (TA Q800). The temperature was then increased to 130° C., then the film was stretched under a certain force and the surface resistance (SR) measured after a certain stretch.

The conductive film used is commercially available from CIMA (SANTE™) which uses self-aligning nano-technology to obtain a silver network on a substrate. There are two types of SANTE™ film, one is a SANTE™ film with a transfer resin, which is for easy transfer from a base, e.g., PET, to another substrate, while the other SANTE™ film is without a transfer resin. Properties for these two types of film are illustrated in Table 1.

TABLE 1

| Performance Properties of SANTE ™ Film | | | |
|---|---|---|---|
| | Transmission (%) | Haze (%) | SR (Ω) |
| SANTE ™ with transfer resin | 80.8 | 6 | |
| SANTE ™ without transfer resin | 80.7 | 4.5 | 7.4 |

In the examples, a 0.25 mm transparent polycarbonate film was used as the substrate with a SANTE™ nano-silver network as the conductive layer.

To apply the ultraviolet curable coating layer and conductive layer to the substrate, the first surface of the recipient polycarbonate substrate and the first surface of the donor substrate was coupled, where the ultraviolet curable transfer coating was disposed therebetween. The recipient substrate and the donor substrate were pressed together, then placed into an oven at 95° C. for 1 minute. The donor substrate was removed from the recipient substrate to form a conductive multilayer sheet. UV curing was carried out using a Fusion UV machine, model F300S-6 processor using an H bulb at 300 Watts per inch, at 7 meters per minute under ambience. After UV curing, the substrate PET film was released, while the ultraviolet curable coating layer remained adhered to the first surface of the substrate and the conductive coating.

To thermoform the multilayer sheet, the polycarbonate film as placed and fixed on the clamp; the mold was raised to push the film out of the clamp before the film was heated, so that the tensile stress would be decreased in the forming process. The mold was released and began to push downward, the multilayer sheet was heated and the temperature of the heater was set to 400° C., and after 12 seconds to 15 seconds, the multilayer sheet surface temperature can reach 160° C. to 175° C. At the same time, the vacuum on the mold is started and the mold raised with the upper heater left on for a few seconds until the mold touches the multilayer sheet.

As seen in Tables 2 to 4, several kinds of UV coating formulations were tested. For example, several multifunctional acrylate oligomers were evaluated as the main coating resin to offer related properties of the ultraviolet curable coating layer and adhesion between the conductive layer and the ultraviolet curable coating layer. It was found that HDDA offers adhesion between the ultraviolet curable coating layer and the substrate. For example, 30% HDDA content can provide sufficient adhesion between the ultraviolet curable coating layer and the substrate. Runtecure™ 1104 was used as a photoinitiator to facilitate curing of the ultraviolet curable coating layer under UV exposure. The ultraviolet coating liquids were blended with a different ratio that were heated at 30 minutes at 60° C. in an oven to achieve dispersion.

The coating formulations in Tables 2 to 4 were used to transfer the conductive layer onto the polycarbonate substrate by ultraviolet curing transfer technology, then the conductive polycarbonate sheets were evaluated for formability by a vacuum thermoforming process with a tool. After thermoforming, the parts were characterized for various performance characteristics including transmission, haze, SR, and compared with data for the polycarbonate sheet measured before the thermoforming process. Each of Formulations 1 to 14 contained 30 wt. %% HDDA, while Formulation 15 contained 25 wt. % HDDA. Each of Formulations 1 to 15 contained 5 wt. % photoinitiator. All amounts listed in Tables 2 to 4 are listed in weight percent.

TABLE 2

Ultraviolet Curable Coating Layer Formulations

| # | DM5272 | DM321HT | DM353L | DM554 | DM5222 | DM583-1 |
|---|---|---|---|---|---|---|
| | | | Double Bond | | | |
| 1 | 65 | | | | | |
| 2 | | 65 | | | | |
| 3 | | | 65 | | | |
| 4 | | | | 65 | | |
| 5 | | | | | 65 | |
| 6 | | | | | | 65 |

TABLE 3

Ultraviolet Curable Coating Layer Formulations

| # | EB8311 | EB8405 (20 wt. % HDDA) | EB8402 | EB8807 | EB303 |
|---|---|---|---|---|---|
| | | Allnex | | | |
| 7 | 65 | | | | |
| 8 | | 65 | | | |
| 9 | | | 65 | | |
| 10 | | | | 65 | |
| 11 | 40 | | | | 25 |

TABLE 4

Ultraviolet Curable Coating Layer Formulations

| # | PM6892 | CN8010 | CN981 | DM554 | TPGDA |
|---|---|---|---|---|---|
| | Cognis | Sartomer | | Double Bond | |
| 12 | 25 | | | | |
| 13 | | 65 | | | |
| 14 | | | 65 | | |
| 15 | | | | 55 | 15 |

Figure 3:
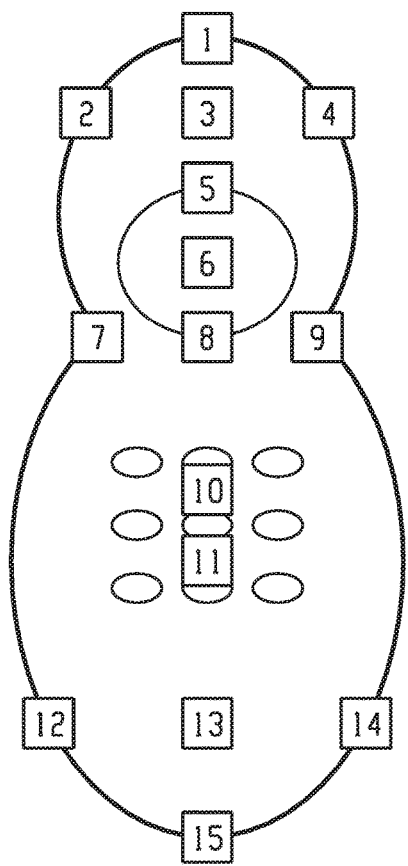
FIG. 3 is an illustration of various testing locations on a thermoformed part including a conductive layer and an ultraviolet curable coating layer.

Tables 5 to 9 illustrate various properties of the multilayer sheet before and after thermoforming, where Tables 6 to 9 illustrate various properties measured at various points on the thermoformed part at locations 1 to 3 illustrated in FIG. 3.

TABLE 6

Surface Resistivity (SR) Before and After Thermoforming

| Formulation # | Formability | SR Before Thermoforming (Ω) | 1 | 2 | 3 | 4 | 5 |
|---|---|---|---|---|---|---|---|
| | | | \multicolumn{5}{|c|}{SR at Different Positions on Thermoforming Part} |
| 1 | Crack | 6.5 | N/A | N/A | N/A | N/A | N/A |
| 2 | Partial OK | 6.2 | 31.4 | 24.2 | 6.2 | 65.7 | ∞ |
| 3 | Partial OK | 5.4 | 28.1 | 20.2 | 5.3 | 38.1 | ∞ |
| 4 | Partial OK | 5.8 | 24.8 | 16.2 | 4.4 | 10.5 | ∞ |
| 5 | Partial OK | 6.2 | 21.5 | 12.2 | 3.5 | 17.1 | ∞ |
| 6 | OK | 6 | 16.5 | 9.2 | 5.3 | 9.7 | 5.4 |
| 7 | Crack | 6.1 | N/A | N/A | N/A | N/A | N/A |
| 8 | OK | 6.4 | 7.5 | 7.3 | 5.7 | 8.1 | 5.2 |
| 9 | OK | 6 | 7.6 | 7.2 | 5 | 10.5 | 6.8 |
| 10 | OK | 5.8 | 7.4 | 8.2 | 6.2 | 9.4 | 7.8 |
| 11 | Partial OK | 5.9 | 16.9 | 12.3 | 5.4 | 17.4 | ∞ |
| 12 | OK | 6.3 | 7.9 | 5.9 | 5.6 | 7.9 | 6.5 |
| 13 | Partial OK | 6.3 | 30.4 | 25.7 | 5.5 | 48.4 | ∞ |
| 14 | OK | 6.5 | 8 | 7 | 5.9 | 12.1 | 6.1 |
| 15 | Partial OK | 6.2 | 11.3 | 8.7 | 5.5 | 13.2 | ∞ |

TABLE 5

Adhesion and Color Comparison Before and After Thermoforming

| Formulation # | Formability | Before Thermoforming | | | After Thermoforming | | |
|---|---|---|---|---|---|---|---|
| | | Adhesion | Transmission | Haze | Adhesion | Transmission | Haze |
| 1 | Crack | 5B | 80.2 | 4.03 | 5B | 80 | 8.5 |
| 2 | Partial OK | 5B | 79.8 | 4.22 | 5B | 79.2 | 4.21 |
| 3 | Partial OK | 5B | 81 | 3.66 | 5B | 80 | 4.01 |
| 4 | Partial OK | 5B | 79.9 | 3.9 | 5B | 80.5 | 4.61 |
| 5 | Partial OK | 5B | 80.1 | 3.86 | 3B | 80.9 | 5.7 |
| 6 | OK | 5B | 81.3 | 3.39 | 4B | 79.2 | 4.26 |
| 7 | Crack | 5B | 79.5 | 4.38 | 5B | 78.6 | 6.74 |
| 8 | OK | 5B | 79.9 | 3.9 | 5B | 79.8 | 4.63 |
| 9 | OK | 5B | 79.9 | 3.98 | 5B | 79 | 5.04 |
| 10 | OK | 5B | 79.5 | 3.82 | 5B | 79.8 | 4.67 |
| 11 | Partial OK | 5B | 78.1 | 8.28 | 5B | 78.9 | 7.88 |
| 12 | OK | 5B | 81 | 3.38 | 5B | 79.2 | 4.25 |
| 13 | Partial OK | 5B | 80.5 | 3.53 | 5B | 81 | 3.77 |
| 14 | OK | 5B | 79.3 | 3.92 | 5B | 80.2 | 3.91 |
| 15 | Partial OK | 5B | 80.5 | 3.72 | 5B | 80 | 5.43 |

TABLE 7

Surface Resistivity (SR) Before and After Thermoforming

| Formulation # | Formability | SR Before Thermoforming (Ω) | SR at Different Positions on Thermoforming Part | | | | |
|---|---|---|---|---|---|---|---|
| | | | 6 | 7 | 8 | 9 | 10 |
| 1 | Crack | 6.5 | N/A | N/A | N/A | N/A | N/A |
| 2 | Partial OK | 6.2 | 6.3 | 7.9 | ∞ | 26 | ∞ |
| 3 | Partial OK | 5.4 | 6.2 | 12.2 | ∞ | 30.5 | ∞ |
| 4 | Partial OK | 5.8 | 6.1 | 16.7 | ∞ | 35 | ∞ |
| 5 | Partial OK | 6.2 | 6 | 21.1 | ∞ | 39.5 | ∞ |
| 6 | OK | 6 | 5 | 5 | 5.2 | 5.3 | 5.9 |
| 7 | Crack | 6.1 | N/A | N/A | N/A | N/A | N/A |
| 8 | OK | 6.4 | 5.3 | 5.6 | 5.6 | 6.7 | 6.4 |
| 9 | OK | 6 | 4.9 | 4.9 | 5.8 | 5.2 | 6.3 |
| 10 | OK | 5.8 | 5 | 5.2 | 6.2 | 5.7 | 6.4 |
| 11 | Partial OK | 5.9 | 5.1 | 5.7 | ∞ | 6.8 | 27 |
| 12 | OK | 6.3 | 5.1 | 4.2 | 5.4 | 4.7 | 5.2 |
| 13 | Partial OK | 6.3 | 6.5 | 10.1 | ∞ | 31.7 | ∞ |
| 14 | OK | 6.5 | 5.5 | 6.1 | 5.8 | 6.2 | 6.9 |
| 15 | Partial OK | 6.2 | 5.2 | 5.7 | ∞ | 6.2 | 12.2 |

TABLE 8

Surface Resistivity (SR) Before and After Thermoforming

| Formulation # | Formability | SR Before Thermoforming (Ω) | SR at Different Positions on Thermoforming Part | | | | |
|---|---|---|---|---|---|---|---|
| | | | 11 | 12 | 13 | 14 | 15 |
| 1 | Crack | 6.5 | N/A | N/A | N/A | N/A | N/A |
| 2 | Partial OK | 6.2 | ∞ | 44.1 | 5.3 | 60.2 | 30.7 |
| 3 | Partial OK | 5.4 | ∞ | 30 | 5.1 | 58.5 | 30.6 |
| 4 | Partial OK | 5.8 | ∞ | 15.9 | 4.9 | 56.8 | 30.5 |
| 5 | Partial OK | 6.2 | ∞ | 1.8 | 4.7 | 55.1 | 30.4 |
| 6 | OK | 6 | 5.7 | 11.9 | 4.9 | 13.7 | 14.2 |
| 7 | Crack | 6.1 | N/A | N/A | N/A | N/A | N/A |
| 8 | OK | 6.4 | 6.7 | 7.7 | 5.4 | 8.3 | 6.9 |
| 9 | OK | 6 | 7.1 | 11.1 | 5.3 | 10.1 | 9.1 |
| 10 | OK | 5.8 | 7.3 | 11.2 | 5.2 | 12.6 | 8.9 |
| 11 | Partial OK | 5.9 | 20.8 | 16 | 4.9 | 18.1 | 19.1 |
| 12 | OK | 6.3 | 5.5 | 8.5 | 4.7 | 8.7 | 7.8 |
| 13 | Partial OK | 6.3 | ∞ | 35 | 4.9 | 53.3 | 38.1 |
| 14 | OK | 6.5 | 7.3 | 9.5 | 5.4 | 9.7 | 8.4 |
| 15 | Partial OK | 6.2 | 12.5 | 13 | 5.2 | 15.5 | 14.4 |

TABLE 9

Surface Resistivity (SR) Before and After Thermoforming

| Formulation # | Formability | SR Before Thermoforming (Ω) | Minimum-Maximum |
|---|---|---|---|
| 1 | Crack | 6.5 | N/A |
| 2 | Partial OK | 6.2 | 6.3-∞ |
| 3 | Partial OK | 5.4 | 5.1-∞ |
| 4 | Partial OK | 5.8 | 4.4-∞ |
| 5 | Partial OK | 6.2 | 1.8-∞ |
| 6 | OK | 6 | 4.9-16.5 |
| 7 | Crack | 6.1 | N/A |
| 8 | OK | 6.4 | 5.2-8.3 |
| 9 | OK | 6 | 4.9-11.1 |
| 10 | OK | 5.8 | 5-12.6 |
| 11 | Partial OK | 5.9 | 5.1-∞ |
| 12 | OK | 6.3 | 4.2-8.7 |
| 13 | Partial OK | 6.3 | 4.9-∞ |
| 14 | OK | 6.5 | 5.5-12.1 |
| 15 | Partial OK | 6.2 | 5.2-∞ |

As can be seen in Tables 5 to 9, each of coating formulations 1 to 15 could transfer the conductive coating to the polycarbonate substrate with an original adhesion of 5B meaning that all of the UV coating formulations can transfer the conductive layer to the polycarbonate substrate with good adhesion successfully. Transmission was maintained greater than or equal to 70%, for example, greater than or equal to 75%, for example, greater than or equal to 80%, while haze was measured at less than or equal to 9, for example, less than or equal to 7, for example, less than or equal to 6, for example, less than or equal to 5, for example, less than or equal to 4. Multilayer sheets made with ultraviolet curable coating formulations 6 and 7 illustrate that the adhesion of the conductive layer decreased to 3B and 4B.

After thermoforming, transmission and haze of the majority of the multilayer sheets did not change drastically and most parts have the same color performance, except that some multilayer sheets made with coating formulation 1 and coating formulation 7 had cracking issues. Formability was checked by visual inspection first and the results demonstrated that multilayer sheets made with ultraviolet curable coating layer formulations 6, 8, 9, 10, 12, and 14 have excellent surface appearance meaning that no cracks were found at any portion of the thermoformed part. Multilayer sheets made with ultraviolet curable coating layer formulations 1 and 7 have cracking issues with the conductive layer. Formulations marked with "partial OK" mean that there are minor cracking issues on certain places of the part because of too deep stretching during thermoforming meaning that these formulations also have worse elongation performance than those formulations having "OK" formability.

As shown in FIG. 3, 15 points were measured based on different stretch levels. For example, as shown in Table 9, the maximum stretch level is found near positions 7 and 9 at around 19% and the weakest stretch level was near positions 3 and 13 at around 2%. As also seen in Tables 6 to 9, the original SR of the polycarbonate multilayer sheets was around 6 Ohms (Ω). Multilayer sheets made with coating formulations 1 and 7 did not have any conductivity due to the cracking. For the parts which measured "OK" formability, SR could be maintained very well, the SR value of all "OK" parts was less than or equal to 17Ω where multilayer sheets made with coating formulations 8 and 12 showed the best formulations with stable and robust SR, for example, even less than 9Ω due to elongation performance. For the "Partial OK" parts, there are cracking at high stretch level, so SR showing ∞, means no conductivity on these part because silver network breaks under deep stretch.

Figure 4:
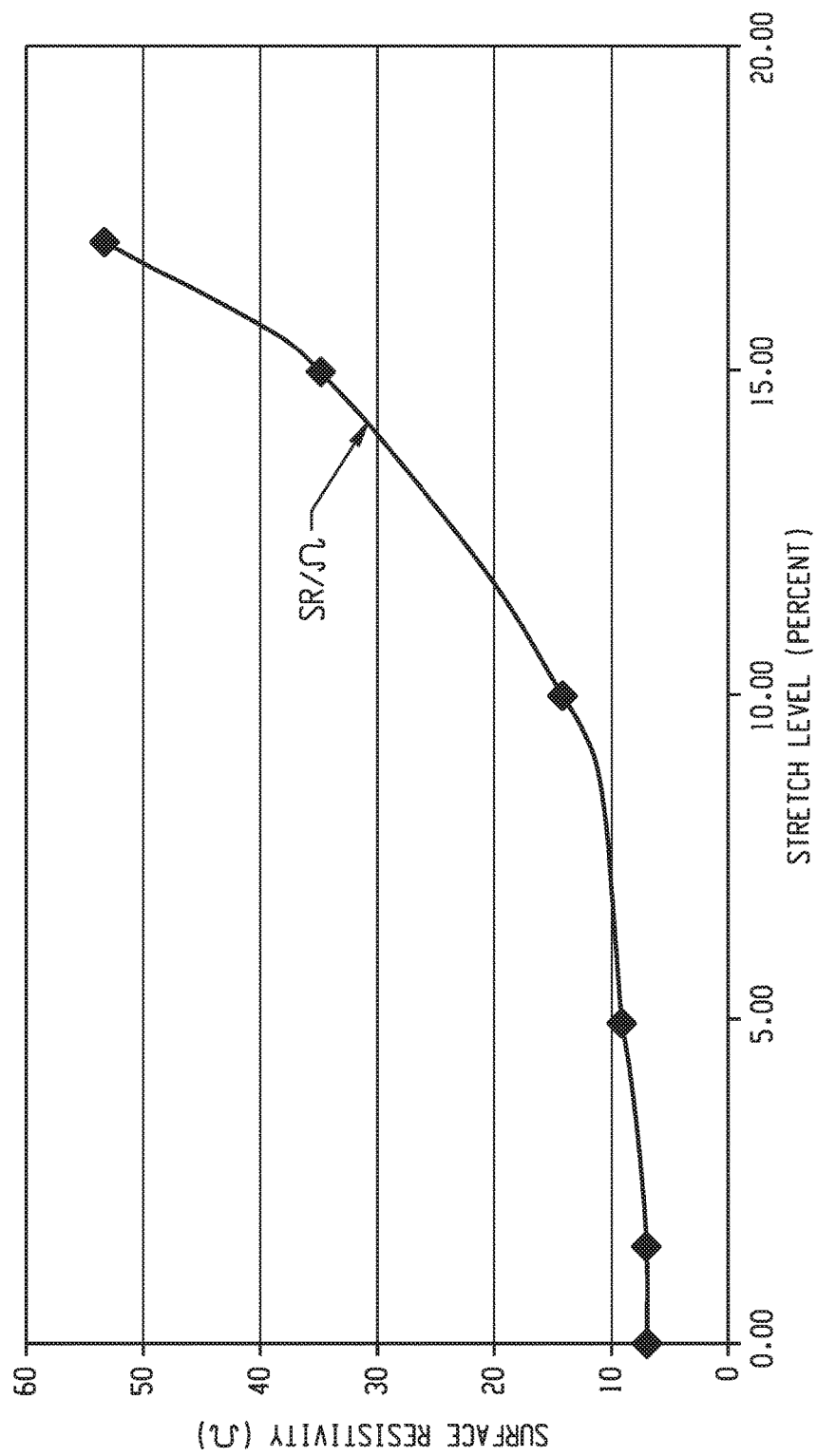
FIG. 4 is a graphical illustration of the stretch level of multilayer sheets compared to surface resistivity.

Film conductivity can change under different stretch levels. For example, higher stretch levels will lose some conductivity. To determine the relationship between stretch level and conductivity, DMA was used to measure tensile elongation of the multilayer sheet under 130° C. and then SR was tested under a certain stretch level. Not wishing to be bound by theory, it is believed that this method cannot match the actual condition of the vacuum thermoforming process 100%, but it can be a good way to demonstrate the stretch behavior to ascertain the relationship between conductivity and stretch level. In the testing, it was discovered that the silver network of the conductive layer begins to break at a 20% stretch level as illustrated in FIG. 4. FIG. 4 illustrates that SR increases with an increment of stretch level. When the stretch level is lower than 10%, the variation of SR is low, while when the range of the stretch level is between 10% to 17%, the SR increases dramatically and even up to 53Ω at a 17% stretch level.

It can be concluded that the formability of the transferred polycarbonate conductive multilayer sheet relies mainly on the flexibility of the UV formulation. Multilayer sheets made with coating formulations 8 to 12 illustrate good thermoforming performance due to good flexibility and formability.

Further, film conductivity will be changed under a different stretch level, basically a higher stretch level will lose some conductivity, while the DMA results illustrate that the when the stretch level is lower than 10%, the variation of SR is very small, while when the range of stretch level is 10% to 17%, the SR increases up to 53Ω at 17%, under a stretch level at a temperature of 130° C.

The multilayer sheets and methods of making disclosed herein include at least the following embodiments:

Embodiment 1

A multilayer sheet, comprising: a substrate including a substrate first surface and a substrate second surface; a conductive layer having a conductive layer first surface disposed on the substrate first surface; and an ultraviolet curable coating layer, comprising a multifunctional acrylate oligomer; and an acrylate monomer; wherein the ultraviolet curable coating layer includes a total weight, wherein 30% to 80% of the total weight comprises the multifunctional acrylate oligomer, and wherein 15% to 65% of the total weight comprises the acrylate monomer; wherein the ultraviolet curable coating layer is disposed on a conductive layer second surface.

Embodiment 2

The multilayer sheet of Embodiment 1, wherein the multifunctional acrylate oligomer comprises an aliphatic urethane acrylate oligomer, a pentaerythritol tetraacrylate, an aliphatic urethane acrylate, an acrylic ester, a dipentaerythritol dexaacrylate, an acrylated resin, a trimethylolpropane triacrylate (TMPTA), a dipentaerythritol pentaacrylate ester, or a combination comprising at least one of the foregoing.

Embodiment 3

The multilayer sheet of any of Embodiments 1-2, wherein the multifunctional acrylate oligomer comprises an aliphatic urethane acrylate oligomer and a pentaerythritol tetraacrylate, wherein the multifunctional acrylate oligomer includes a multifunctional acrylate oligomer weight, wherein 30% to 50% of the multifunctional acrylate oligomer weight comprises the aliphatic urethane acrylate oligomer, and wherein 50% to 70% of the multifunctional acrylate oligomer weight comprises the pentaerythritol tetraacrylate.

Embodiment 4

The multilayer sheet of any of Embodiments 1-3, wherein the multifunctional acrylate oligomer comprises acrylated resin.

Embodiment 5

The multilayer sheet of any of Embodiments 1-4, wherein the ultraviolet curable coating layer further comprises a photoinitiator, wherein 3% to 7% of the total weight comprises the photoinitiator.

Embodiment 6

The multilayer sheet of Embodiment 5, wherein the photoinitiator comprises an α-hydroxyketone photoinitiator.

Embodiment 7

The multilayer sheet of Embodiment 6, wherein the α-hydroxyketone photoinitiator is 1-hydroxy-cyclohexyl-phenylketone.

Embodiment 8

The multilayer sheet of any of Embodiments 1-7, wherein the acrylate monomer comprises 1,6-hexanediol diacrylate.

Embodiment 9

The multilayer sheet of any of Embodiments 1-8, wherein the substrate comprises polycarbonate, poly(methyl methacrylate) (PMMA), polyethylene terephthalate (PET), polyethylene naphthalate (PEN), a cyclic olefin copolymer (COC), polyetherimide (PEI), polystyrene, polyimide, polypropylene (PP), polyethylene (PE), polyvinyl fluoride (PVF), polyvinylidene fluoride (PVDF), glass, or a combination comprising at least one of the foregoing.

Embodiment 10

The multilayer sheet of any of Embodiments 1-9, wherein the ultraviolet curable coating layer can adhere to a polycarbonate substrate with an adhesion strength of 5B as measured according to ASTM D3359.

Embodiment 11

The multilayer sheet of any of Embodiments 1-10, wherein the ultraviolet curable coating layer can adhere to the conductive layer with an adhesion strength of 5B as measured according to ASTM D3359.

Embodiment 12

The multilayer sheet of any of Embodiments 1-11, wherein the multilayer sheet has a transmittance of greater than or equal to 80% as measured according to ASTM D1003 Procedure A using CIE standard illuminant C.

Embodiment 13

A method of making a multilayer sheet, comprising: forming a substrate including a substrate first surface and a substrate second surface; applying a conductive layer including a base and a conductive coating to the substrate first surface; and applying an ultraviolet cured coating layer to a surface of the conductive layer opposite that in contact with the substrate second surface, wherein the ultraviolet cured coating layer comprises a multifunctional acrylate oligomer and an acrylate monomer, wherein the ultraviolet cured coating layer includes a total weight, wherein 30% to 80% of the total weight comprises the multifunctional acrylate oligomer, and wherein 15% to 65% of the total weight comprises the acrylate monomer; pressing the substrate, conductive layer, and ultraviolet cured coating layer together to form a stack; heating the stack; activating the ultraviolet cured coating layer with an ultraviolet radiation source; and removing the base from the stack leaving a conductive multilayer sheet; wherein the ultraviolet cured coating layer remains adhered to the conductive layer.

Embodiment 14

The method of Embodiment 13, wherein the wherein the substrate comprises polycarbonate, poly(methyl methacrylate) (PMMA), polyethylene terephthalate (PET), polyethylene naphthalate (PEN), cyclic olefin copolymers (COC), polyetherimides (PEI), polystyrenes, polyimides, polypropylenes (PP) and polyethylenes (PE), polyvinyl fluourides (PVF), polyvinylidene fluorides (PVDF), glass, or a combination comprising at least one of the foregoing.

Embodiment 15

The multilayer sheet of any of Embodiments 13-14, wherein the ultraviolet curable coating layer further comprises a photoinitiator, wherein 3% to 7% of the total weight comprises the photoinitiator.

Embodiment 16

The method of any of Embodiments 13-15, further comprising thermoforming the multilayer sheet to form a thermoformed article.

Embodiment 17

The method of Embodiment 16, wherein the thermoforming comprises: placing the multilayer sheet on a clamp of a mold; fixing the multilayer sheet to the clamp; pushing the multilayer sheet out of the clamp by raising the mold; lowering the mold; heating the multilayer sheet while simultaneously beginning the vacuum and raising the mold to form the thermoformed article.

Embodiment 18

The method of any of Embodiments 13-17, wherein the ultraviolet curable coating layer can adhere to a polycarbonate substrate with an adhesion strength of 5B as measured according to ASTM D3359.

Embodiment 19

The method of any of Embodiments 13-18, wherein the ultraviolet curable coating layer can adhere to the conductive layer with an adhesion strength of 5B as measured according to ASTM D3359.

Embodiment 20

The method of any of Embodiments 13-19, wherein the thermoformed article has a transmittance of greater than or equal to 80% as measured according to ASTM D1003 Procedure A using CIE standard illuminant C.

Embodiment 21

The method of any of Embodiments 13-20, wherein the surface resistivity of the thermoformed article is less than or equal to 60 Ohms.

Embodiment 22

The method of any of Embodiments 13-21, wherein the thermoformed article has an elongation of less than or equal to 20% at a temperature of less than or equal to 130° C., when measured by dynamic mechanical analysis.

Unless otherwise specified herein, any reference to standards, testing methods and the like, such as ASTM D1003, ASTM D3359, ASTM D3363, refer to the standard, or method that is in force at the time of filing of the present application.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A multilayer sheet, comprising:
   a substrate comprising a substrate first surface and a substrate second surface;
   a conductive layer having a conductive layer first surface disposed on the substrate first surface; and
   an ultraviolet curable coating layer, comprising
      a multifunctional acrylate oligomer; and
      an acrylate monomer;
      wherein the ultraviolet curable coating layer includes a total weight, wherein 30% to 80% of the total weight comprises the multifunctional acrylate oligomer, and wherein 15% to 65% of the total weight comprises the acrylate monomer;
   wherein the ultraviolet curable coating layer is disposed on a conductive layer second surface.

2. The multilayer sheet of claim 1, wherein the multifunctional acrylate oligomer comprises an aliphatic urethane acrylate oligomer, a pentaerythritol tetraacrylate, an aliphatic urethane acrylate, an acrylic ester, a dipentaerythritol dexaacrylate, an acrylated resin, a trimethylolpropane triacrylate (TMPTA), a dipentaerythritol pentaacrylate ester, or a combination comprising at least one of the foregoing.

3. The multilayer sheet of claim 1, wherein the multifunctional acrylate oligomer comprises an aliphatic urethane acrylate oligomer and a pentaerythritol tetraacrylate, wherein the multifunctional acrylate oligomer includes a multifunctional acrylate oligomer weight, wherein 30% to 50% of the multifunctional acrylate oligomer weight comprises the aliphatic urethane acrylate oligomer, and wherein 50% to 70% of the multifunctional acrylate oligomer weight comprises the pentaerythritol tetraacrylate.

4. The multilayer sheet of claim 1, wherein the ultraviolet curable coating layer further comprises a photoinitiator, wherein 3% to 7% of the total weight comprises the photoinitiator.

5. The multilayer sheet of claim 4, wherein the photoinitiator comprises an α-hydroxyketone photoinitiator.

6. The multilayer sheet of claim 5, wherein the α-hydroxyketone photoinitiator is 1-hydroxy-cyclohexylphenylketone.

7. The multilayer sheet of claim 1, wherein the acrylate monomer comprises 1,6-hexanediol diacrylate.

8. The multilayer sheet of claim 1, wherein the substrate comprises polycarbonate, poly(methyl methacrylate) (PMMA), polyethylene terephthalate (PET), polyethylene naphthalate (PEN), a cyclic olefin copolymer (COC), polyetherimide (PEI), polystyrene, polyimide, polypropylene (PP), polyethylene (PE), polyvinyl fluouride (PVF), polyvinylidene fluoride (PVDF), glass, or a combination comprising at least one of the foregoing.

9. The multilayer sheet of claim 1, wherein the ultraviolet curable coating layer can adhere to a polycarbonate substrate with an adhesion strength of 5B as measured according to ASTM D3359.

10. The multilayer sheet of claim 1, wherein the multilayer sheet has a transmittance of greater than or equal to 80% as measured according to ASTM D1003 Procedure A using CIE standard illuminant C.

11. A method of making a multilayer sheet, comprising:
forming a substrate comprising a substrate first surface and a substrate second surface;
applying a conductive layer comprising a base and a conductive coating to the substrate first surface; and
applying an ultraviolet cured coating layer to a surface of the conductive layer opposite that in contact with the substrate second surface, wherein the ultraviolet cured coating layer comprises a multifunctional acrylate oligomer and an acrylate monomer, wherein the ultraviolet cured coating layer includes a total weight, wherein 30% to 80% of the total weight comprises the multifunctional acrylate oligomer, and wherein 15% to 65% of the total weight comprises the acrylate monomer;
pressing the substrate, conductive layer, and ultraviolet cured coating layer together to form a stack;
heating the stack;
activating the ultraviolet cured coating layer with an ultraviolet radiation source; and
removing the base from the stack leaving a conductive multilayer sheet;
wherein the ultraviolet cured coating layer remains adhered to the conductive layer.

12. The multilayer sheet of claim 11, wherein the ultraviolet curable coating layer further comprises a photoinitiator, wherein 3% to 7% of the total weight comprises the photoinitiator.

13. The method of claim 11, further comprising thermoforming the multilayer sheet to form a thermoformed article.

14. The method of claim 13, wherein the thermoforming comprises:
placing the multilayer sheet on a clamp of a mold;
fixing the multilayer sheet to the clamp;
pushing the multilayer sheet out of the clamp by raising the mold;
lowering the mold;
heating the multilayer sheet while simultaneously beginning the vacuum and raising the mold to form the thermoformed article.

15. The method of claim 11, wherein the ultraviolet curable coating layer can adhere to a polycarbonate substrate with an adhesion strength of 5B as measured according to ASTM D3359.

16. The method of claim 11, wherein the thermoformed article has a transmittance of greater than or equal to 80% as measured according to ASTM D1003 Procedure A using CIE standard illuminant C.

17. The method of claim 11, wherein the surface resistivity of the thermoformed article is less than or equal to 60 Ohms.

18. The method of claim 11, wherein the thermoformed article has an elongation of less than or equal to 20% at a temperature of less than or equal to 130° C., when measured by dynamic mechanical analysis.

19. The multilayer sheet of claim 1, wherein the conductive layer comprises metal particles arranged in a network of interconnected metal traces defining randomly shaped openings on the substrate first surface.

20. The method of claim 11, wherein the conductive layer comprises metal particles arranged in a network of interconnected metal traces defining randomly shaped openings on the substrate first surface.

* * * * *